Jan. 12, 1943. H. F. PLAUT ET AL 2,307,951
OPTICAL INSTRUMENT FOR OBSERVING, COMPARING OR MEASURING ANGLES
Filed May 27, 1941 3 Sheets-Sheet 1

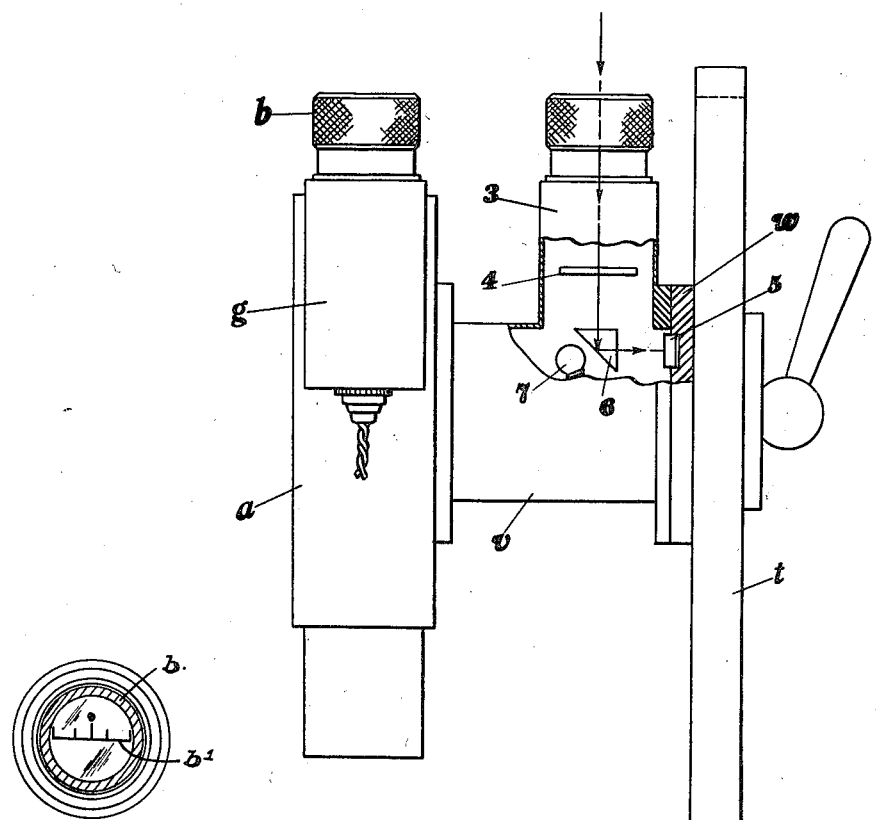
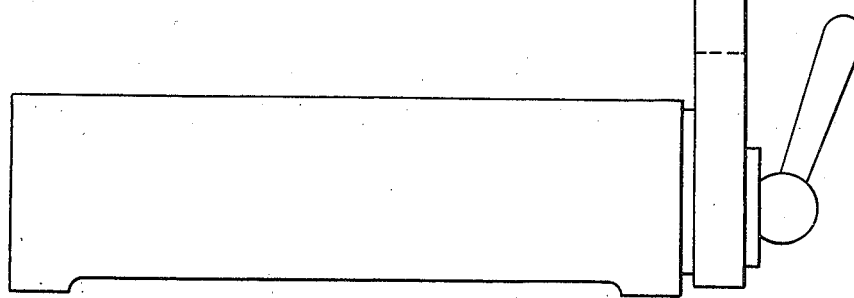
Fig. 4.
Fig. 3

Patented Jan. 12, 1943

2,307,951

UNITED STATES PATENT OFFICE 2,307,951

OPTICAL INSTRUMENT FOR OBSERVING, COMPARING, OR MEASURING ANGLES

Hermann Franz Plaut, George Primrose Barrott, and Charles William True, Mitcham Junction, England, assignors to Precision Grinding Limited, Mitcham Junction, Surrey, England Application May 27, 1941, Serial No. 395,488
In Great Britain June 11, 1940

4 Claims. (Cl. 88—2.4)

This invention has for its object to provide an improved optical instrument for observing, comparing, or measuring angles.

The invention comprises the combination of a box-like body part, an eye-piece and graticule arranged at one end of the body part, an object lens arranged at the opposite end, and a pair of opposed and obliquely mounted mirrors arranged within the body part between the eye-piece and the object lens.

In the accompanying sheets of explanatory drawings:

Figure 3 is a part sectional side view illustrating a modified detail.

Figure 4 is an inverted sectional plan illustrating to a larger scale an eye piece shown in the other figures.

In carrying the invention into effect as shown, we employ a box-like body part $a$ of rectangular form. On the upper end and adjacent to one of the sides of the body part $a$ we arrange an eye-piece $b$ which extends from a small housing $c$ containing a graticule $d$ and a prism $e$, the base of the housing and a corresponding part of the upper end of the body part being formed with registering openings, as indicated by $f$, beneath the graticule. At one side the housing $c$ is open, and adjacent to this side of the housing there may be mounted on the corresponding side of the body part $a$ a casing $g$ containing a small electric lamp bulb $h$ from which light can pass through the prism $e$ for illuminating the graticule $d$. In the lower end and adjacent to the opposite side of the body part $a$ we arrange an object lens $i$ which is carried by a tubular mounting $j$ extending through the lower end of the body part. Within the body part $a$ we also arrange a pair of opposed and obliquely mounted mirrors $m$, $n$. The mirror $m$ is situated in a fixed position near the lower end of the body part and in line with the eye-piece $b$. The other mirror $n$ is pivotally mounted at $o$ near the upper end of the body part and in line with the object lens $i$, and is adjustable about its pivot axis by an adjusting screw $p$ passing through the upper end of the body part, the upper end of the screw being formed with a graduated head $q$ for co-operating with a fixed index $r$ on the upper end of the body part. Normally the faces of the mirrors $m$, $n$ are parallel with each other and are inclined at about 30° to the ends of the body part $a$.

Figure 1:
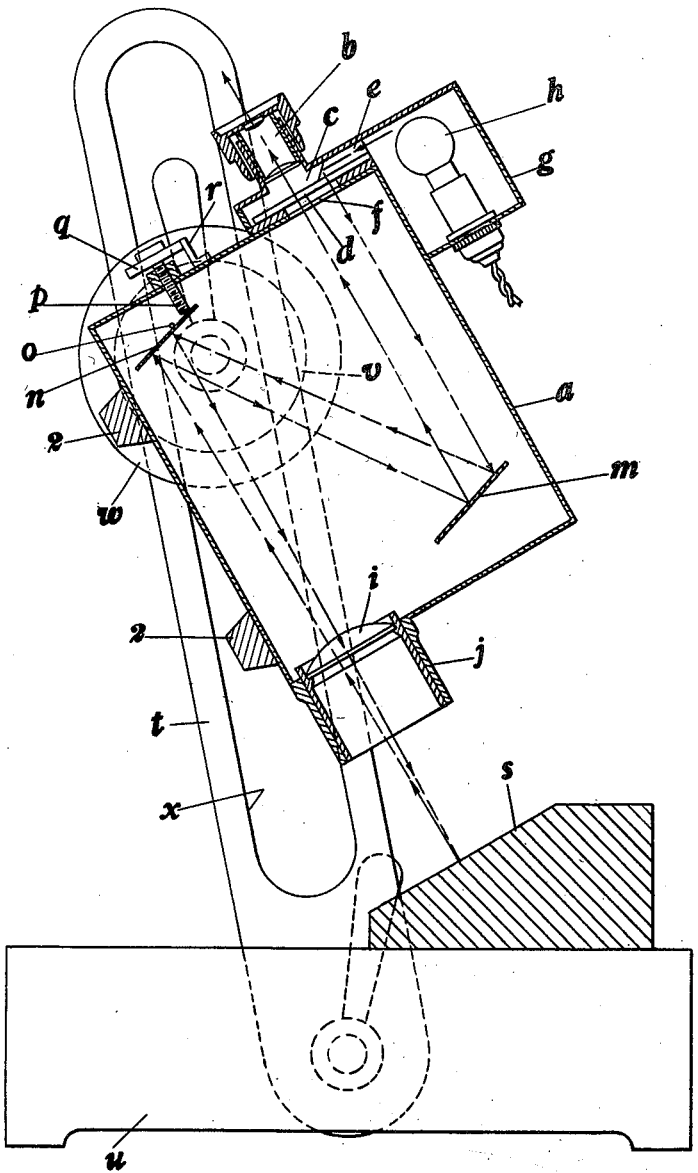
Figure 1 is a sectional side elevation of an instrument constructed in accordance with the invention.
Figure 2:
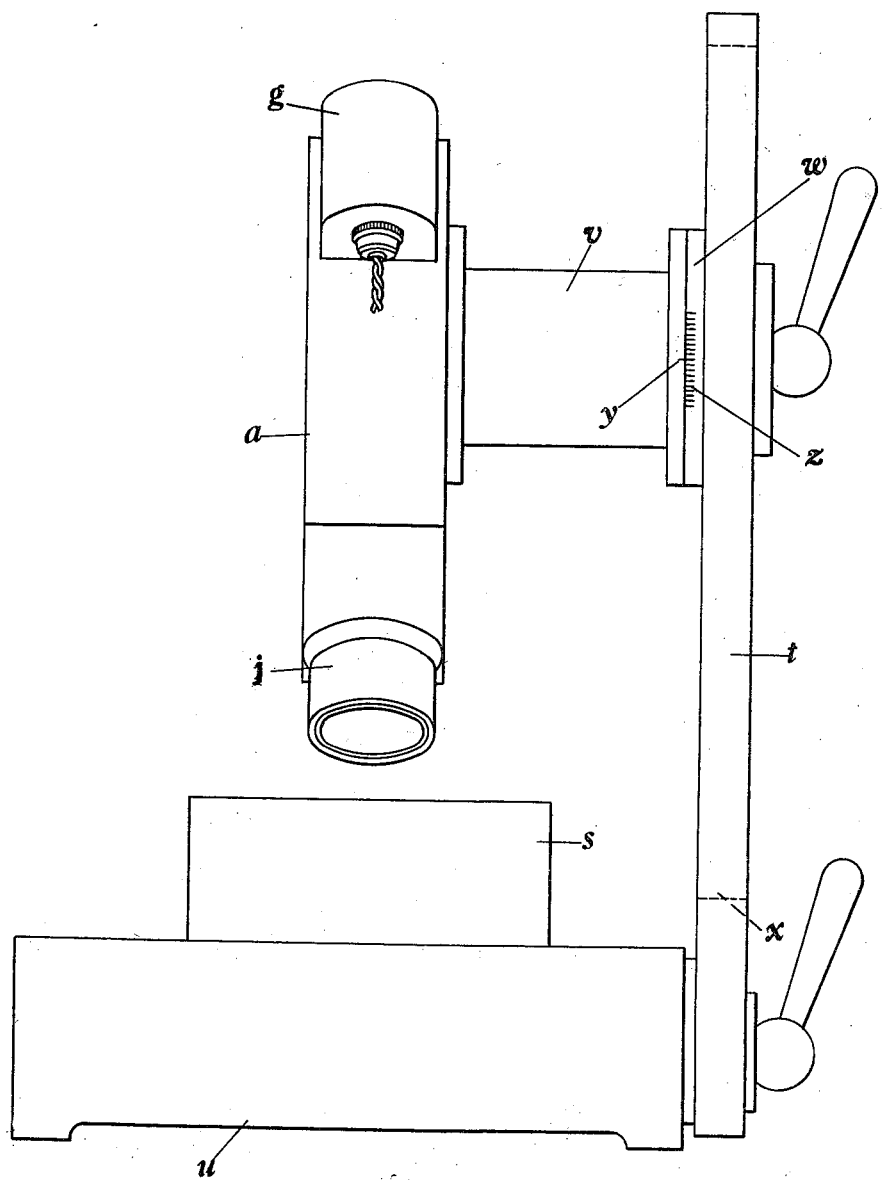
Figure 2 is an elevation taken at right angles to Figure 1.

The relative disposition of the optical elements above described is such that a light ray passing through the prism $e$ from the lamp casing $g$ is deflected through the graticule $d$ on to the first mirror $m$, and from this to the second mirror $n$. The latter then reflects the ray and graticule image through the object lens $i$ on to the surface of the object as $s$ to be viewed. The ray and graticule image are returned from the object $s$ through the object lens $i$ and by the mirrors $m$, $n$, to the eye-piece $b$ which carries a fixed scale $b^1$ (Figure 4). Deviation of the light ray reflected from the object $s$ is observed through the eye-piece $b$ by the displacement of the graticule image relatively to a zero mark on the fixed scale. The path of the light ray is indicated by arrows in Figure 1. When the object to be viewed is not a sufficiently good reflector we may place on it an optically prepared flat piece of glass.

To enable the body part $a$ to be set in any desired position relatively to, for example, a work piece having an inclined surface to be viewed, we may employ an arm $t$ for supporting the body part, one end of this arm being adjustably or otherwise secured to a base $u$ on which the work piece can be placed. For attaching the body part $a$ to the arm $t$ there is provided on one side of the body part a cylindrical or other projecting member $v$ which at its outer end can be adjustably secured to a carrier $w$, so that the body part, together with the projecting member, is angularly adjustable relatively to the carrier about the longitudinal axis of the projecting member, the carrier being adjustably mounted in a slot $x$ formed longitudinally in the arm. For determining the angular relationship of the body part $a$ to the arm $t$, the adjacent ends of the projecting member $v$ and the carrier $w$ may be respectively provided on their peripheries with an index mark $y$ and a fixed scale $z$.

Alternatively any convenient optical means may be provided for determining the angular relationship of the body part $a$ and arm $t$. Thus, as shown in Figure 3, the projecting member $v$ (which is hollow) may have combined with it another eye-piece 3 through which the relative positions of a graticule 4 in this eye-piece and a circular scale 5 on the adjacent end of the carrier $w$ can be observed, a prism 6 being situated between this graticule and scale within the projecting member which may also contain illuminating means in the form of a small electric lamp bulb 7.

When it is required to compare an inclined surface of an object with an inclined surface of another or standard object, the required setting of the body part $a$ is effected by arranging the latter object on the base $u$ and using the inclined surface of this object to reflect the light ray and graticule image while adjusting the body part and mirror $n$ until the graticule image coincides with the zero mark on the fixed scale in the eyepiece $b$, the adjusting movement of the body part serving to effect coarse adjustment of the graticule image, and the adjusting movement of the mirror serving to effect fine adjustment of the graticule image.

To enable the box-like body part (when detached from the above described carrier) to be supported on a flat surface (whether vertical or horizontal) the body part is provided with feet 2.

It is already known to employ instruments of the telescopic type for the same purposes as the invention. By the employment of a box-like body part having combined with it optical elements in the manner above described we are able to provide an instrument of more compact and convenient form. The invention is not, however, limited to the example shown as subordinate details may be varied to suit requirements.

Having thus described our invention what we claim as new and desire to secure by Letters Patent is:

1. An optical instrument for observing, comparing or measuring angles, comprising the combination of a box-like body part, an eye-piece and graticule arranged at one end of the body part, an object lens arranged at the opposite end of the body part, and a pair of opposed and obliquely mounted mirrors arranged within the body part between the eye-piece and the object lens, and means for effecting relative adjustment of the mirrors to cause an image of the graticule to be reflected by the mirrors through a predetermined path which includes the eye piece and object lens.

2. An optical instrument as claimed in claim 1, in which one of the mirrors is pivotally mounted and has combined with it means whereby it can be adjusted about its pivotal axis, the other mirror being fixed.

3. An optical instrument as claimed in claim 1 and having means whereby the body part can be pivotally mounted and secured in any desired angular position on a support.

4. An optical instrument as claimed in claim 1 and having in combination means whereby the body part can be pivotally mounted and secured in any desired angular position on a support, and optical means including an additional eye piece for determining the position of the body relative to its support.

HERMANN FRANZ PLAUT.
GEORGE PRIMROSE BARROTT.
CHARLES WILLIAM TRUE.